Figure 1:
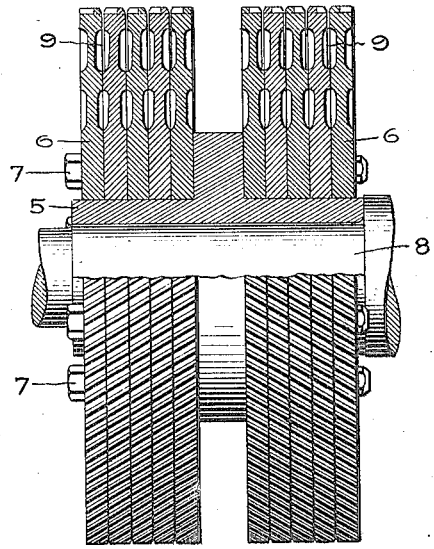

E. H. FARQUHAR.
METHOD OF MANUFACTURING ELASTIC HELICAL GEARS.
APPLICATION FILED JUNE 25, 1915.

1,166,402.

Patented Dec. 28, 1915.

Inventor:
Edmund H. Farquhar,
by Albert G. Davis
His Attorney.

UNITED STATES PATENT OFFICE.

EDMUND H. FARQUHAR, OF SCHENECTADY, NEW YORK, ASSIGNOR TO GENERAL ELECTRIC COMPANY, A CORPORATION OF NEW YORK.

METHOD OF MANUFACTURING ELASTIC HELICAL GEARS.

1,166,402.  Specification of Letters Patent.  Patented Dec. 28, 1915.

Application filed June 25, 1915. Serial No. 36,293.

*To all whom it may concern:*

Be it known that I, EDMUND H. FARQUHAR, a citizen of the United States, residing at Schenectady, in the county of Schenectady, State of New York, have invented certain new and useful Improvements in the Method of Manufacturing Elastic Helical Gears, of which the following is a specification.

The present invention relates to an improved method of manufacturing elastic helical gears of the type which comprises a plurality of disks or laminæ fixed on a common support or shaft, and slightly spaced apart at their peripheries to permit of axial yielding under tooth pressure. From one aspect, such gears may be considered as comprising a plurality of disks or laminæ clamped together and having a portion of the material between each two disks adjacent the periphery removed to form the desired space. The teeth on these gears must necessarily be formed after the plates have been assembled in order to insure that they are correct. It is not possible, however, to cut the teeth on the disks with the peripheral portions spaced apart, as they would yield and vibrate under the pressure of the cutting tool to such an extent that the teeth would not be true. On the other hand, it is not possible to cut away the material from between the disks to form the space after the blank has been assembled, as the width of the space is so slight as compared to its depth that a suitable tool could not be constructed to perform the work. For example, the width of this space in ordinary practice may be only about .01″. Furthermore, it would not be desirable to disassemble the gear after the teeth have been cut in order to remove the desired material, owing to the difficulty of reassembling the disks again in exact relative position.

The object of the present invention is to provide an improved method of manufacturing these gears whereby the teeth may be cut on what is substantially a solid blank.

In carrying out my invention I remove all the material which is to be removed from between the respective disks, with the exception of the outer peripheral portion thereof, before the disks are assembled. I then assemble the disks in the desired manner, clamping them firmly together at their central portions. I then cut the teeth on the face of the blank, after which the remainder of the material which is to be removed for forming the space between the disks is cut away by a suitable tool. As it is located at the outer edge of the disks it is easily removed. By this method I am enabled to readily construct the gear and cut the teeth thereon without difficulty.

Figure 2:
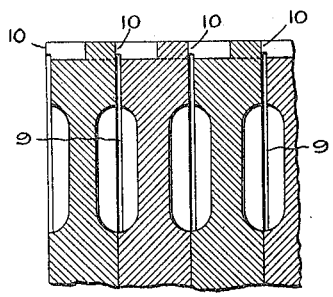
Figure 3:
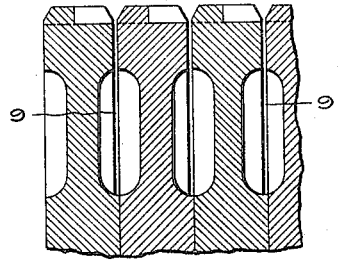
Figure 4:
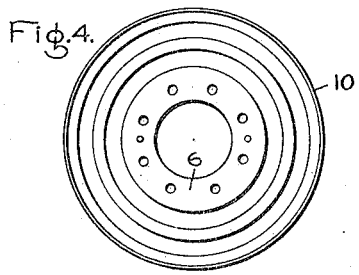

Referring to the accompanying drawing, Figure 1 is a side view partly in section illustrating a completed gear constructed in accordance with my improved method; Fig. 2 is a detailed sectional view illustrating an intermediate step in my method; Fig. 3 is a similar view showing the completed gear; and Fig. 4 is a face view, on a smaller scale, of one of the disks before the teeth are cut thereon.

Referring to the drawing Fig. 1, 5 indicates a support upon which is mounted the disks or laminæ 6 firmly clamped and held together by the bolts 7. The support is carried by a shaft 8. This figure shows a completed gear, and it will be noticed that the disks or laminæ are spaced slightly apart at their peripheries, as indicated at 9. It will be seen that this space is of considerable radial depth as compared to its width. The width of the spaces between the disks is considerably exaggerated in the drawing, for the sake of illustration.

In constructing the gear in accordance with my improved method, the disks or laminæ are machined to the proper thickness, and all of the material for forming the space between the outer periphery of the disks is removed, with the exception of the outer portion, as indicated at 10 in Fig. 2. In the present instance, the space is formed by removing all the material from the side of one of two adjacent disks, as this is the simpler way, but it will be understood that a portion might be removed from the adjacent sides of each disk if desired. The disks or laminæ are then assembled and fixed on their support, and when so assembled would have the general appearance as shown in Fig. 2, with the exception that there would be no teeth on them. After being assembled, the blank is finished to size and the helical teeth cut thereon. The material 10, which is left between the disks, serves to back up the disks so that there can be no vibration, and the teeth can be readily cut on an ordinary gear cutting machine. The cutting of the teeth removes a portion of the material 10, as will be obvious; i. e., the portion between the teeth. After the teeth have been cut, the gear is placed in a suitable lathe, and the remainder of the material 10 is removed. Owing to the fact that the space 9 is of such a very narrow width, I do not at present find it practical to provide a tool which will remove just the material 10 alone, although this would be preferable. I, therefore, preferably remove the material 10 by cutting a V-shaped annular notch between each two disks. This gives a completed structure, as shown in Fig. 3. It will be understood, however, that my invention is not limited to this specific way.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new, and desire to secure by Letters Patent of the United States, is:—

1. The method of manufacturing elastic helical gears comprising a plurality of disks or laminæ clamped together at their central portions and slightly spaced apart at their peripheries, which consists in removing all but a limited portion of the material to be removed fro between said disks or laminæ for forming the spaces between them, mounting said disks or laminæ on a rigid support, cutting the teeth thereon, and then removing the remainder of said material.

2. The method of manufacturing elastic helical gears comprising a plurality of disks or laminæ clamped together at their central portions and slightly spaced apart at their peripheries, which consists in removing all but the outer portion of the material to be removed from between said disks or laminæ for forming the spaces between them, mounting said disks or laminæ on a rigid support, cutting the teeth thereon, and then removing the remainder of said material.

3. The method of manufacturing elastic helical gears comprising a plurality of disks or laminæ clamped together at the central portion and slightly spaced apart at their peripheries, which consists in forming the disks or laminæ with integral projections at their outer edges, the width of which is equal to the distance which the disks are to be spaced apart, assembling said disks or laminæ on a support, cutting the teeth thereon, and then removing said projections.

4. The method of manufacturing elastic helical gears comprising a plurality of disks or laminæ clamped together at their central portions and slightly spaced apart at their peripheries, which consists in removing all but the outer portion of the material to be removed from between said disks or laminæ for forming the space between them, mounting said disks or laminæ on a rigid support, cutting the teeth thereon, thereby removing a portion of said material, and then removing the remainder of said material by cutting between said teeth in a circumferential direction.

In witness whereof, I have hereunto set my hand this 24th day of June, 1915.

EDMUND H. FARQUHAR.